Figure 1:
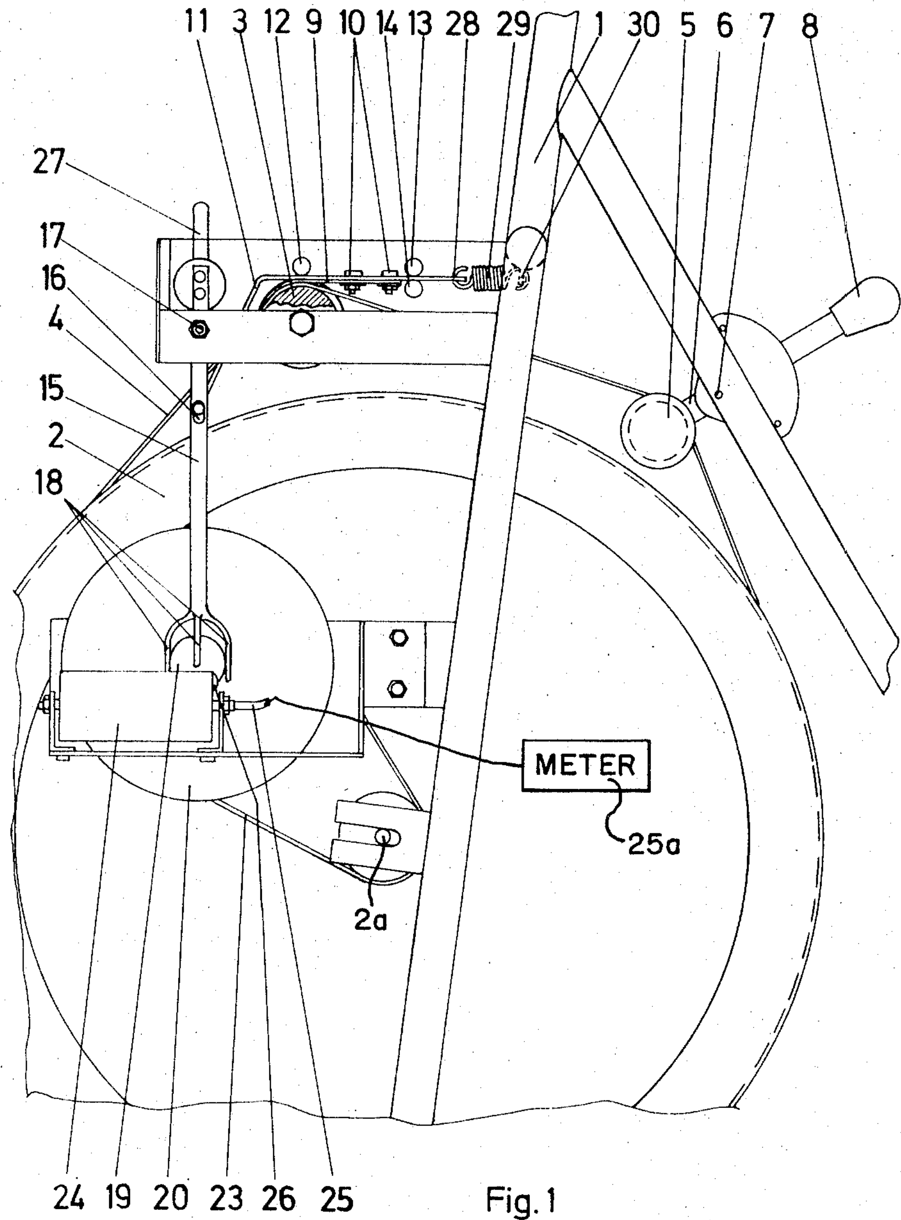

United States Patent [19]
Blomberg et al.
[11] 3,845,663
[45] Nov. 5, 1974

[54] BICYCLE EXERCISER WITH WORK INDICATOR STRUCTURE

[75] Inventors: Folke Ivar Blomberg, Lidingo; Marten Engerstam, Huddinge, both of Sweden

[73] Assignee: Monark-Crescent AB, Varberg, Sweden

[22] Filed: Nov. 6, 1972

[21] Appl. No.: 303,948

[30] Foreign Application Priority Data

Nov. 11, 1971 Sweden .......... 14411/71

[52] U.S. Cl. .......... 73/379, 74/198, 272/73, 272/DIG. 5

[51] Int. Cl. .......... G01l 5/02

[58] Field of Search..... 272/73, 79 R, 79 D, DIG. 3, 272/DIG. 4, DIG. 5; 73/135, 379; 74/194, 198

[56] References Cited

UNITED STATES PATENTS

| | | | |
|---|---|---|---|
| 2,510,973 | 6/1950 | Guillemin, Jr. | 73/135 X |
| 2,602,338 | 7/1952 | Opocensky et al. | 74/198 |
| 3,097,539 | 7/1963 | Opocensky | 74/198 |
| 3,192,772 | 7/1965 | Tarter | 73/379 |
| 3,511,097 | 5/1970 | Corwin | 73/379 |
| 3,643,943 | 2/1972 | Erwin, Jr. et al. | 272/73 X |

*Primary Examiner*—Richard C. Pinkham
*Assistant Examiner*—R. T. Stouffer
*Attorney, Agent, or Firm*—Young & Thompson

[57] ABSTRACT

A bicycle exerciser or ergometer has a flywheel which is driven by a pedal crank shaft and is influenced by variable brake power. The pedal crank shaft is also coupled to the input shaft of a variable gear including a setting member for adjusting the gear ratio, which setting member is coupled to a device sensing the brake power. The output shaft of the variable gear is coupled to an instrument which indicates and/or registers the instantaneous effect take-off from a pedaling person and/or the energy delivered by the pedaling person during a certain time. One embodiment of the variable gear comprises an input disc-shaped member, an output rotatable cylindrical member and a ball mounted therebetween on a movable pendulum arm and in frictional contact with both the disc-shaped member and the cylindrical member.

4 Claims, 5 Drawing Figures

11 3 12 9 10 14 13 28 29 1 30 5 6 7 8
27
17
16
4
15
2
18
METER
25a
2a
24 19 20 23 26 25

BICYCLE EXERCISER WITH WORK INDICATOR STRUCTURE

The present invention relates to a bicycle exerciser or ergometer having a member driven by a pedal crank shaft and influenced by a variable brake power.

It is an object of the invention to improve these bicycles, so that it will be possible to read directly the instantaneous effort delivered to the bicycle, the energy delivered during a certain time and the instantaneous pedal power used (alternatively the brake power acting on the flywheel of the bicycle) and so that the reading can be made continuously and independently if the load and/or the pedal speed varies. Known bicycles have not been provided with such reading possibilities with the exception of such bicycles which are intended for advanced medical use and which work with the aid of refined electrical devices and are produced at a very high price. Other and cheaper methods than the purely electrical ones have not hitherto been used for the measurement of effect and/or energy, primarily because of the difficulty to achieve a reliable solution of the problem when using non-electrical methods.

There is a need for a cheap bicycle having a device for indicating effort, energy and power. An important market is private persons. These have a need for energy indication in connection with effort indication in connection with body-building exercise, in connection with rehabilitation after heart diseases and in those cases where, the generation of effort must be kept on a lower level than what subjectively can be interpreted as acceptable, and finally for power indication, e.g. in connection with power emphasized exercise. Except among private persons there is an important range of application among athletic organizations and among institutions for medical attendance, rehabilitation and health service, among which a better adaptation to the qualifications of each training individual could be achieved through having the possibility to continuously read and control the training intensity independent of the pedal speed or pedal power the individual prefers.

The invention is based on the development of a mechanical, infinitely variable gear and the use of said gear as an integrator with respect to position, and the use of a counting and a, with respect to the time, derivating instrument of such a type as, due to its use as mileometer and speedometer in vehicles, is made in large quantites and at a cheap price.

Figure 2:
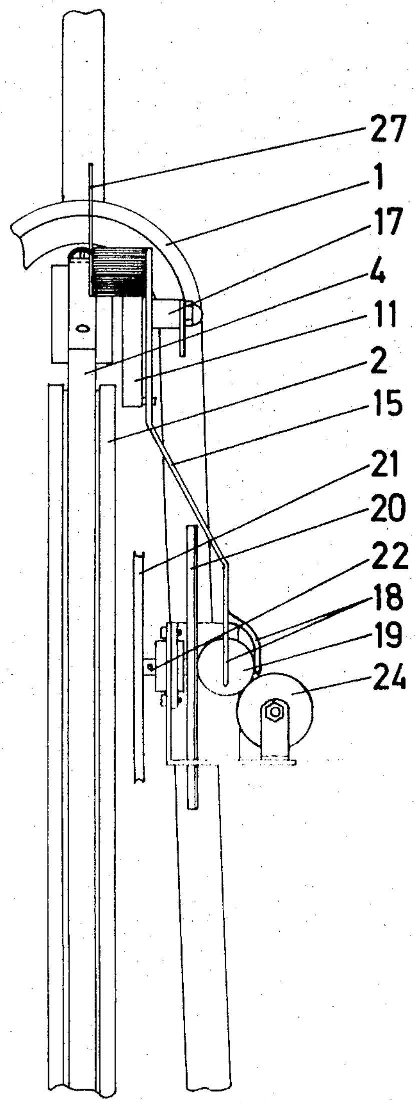
Figure 5:
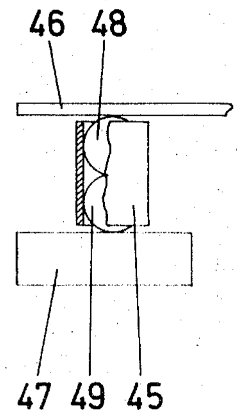
Figure 3:
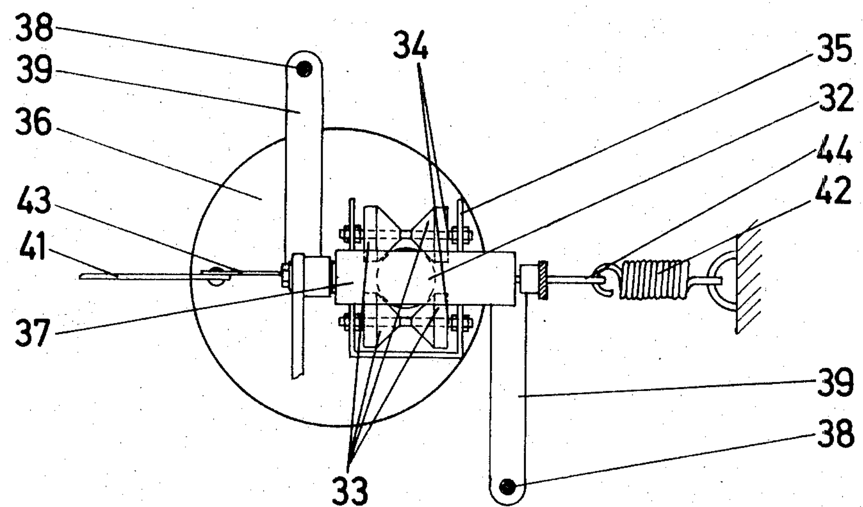
Figure 4:
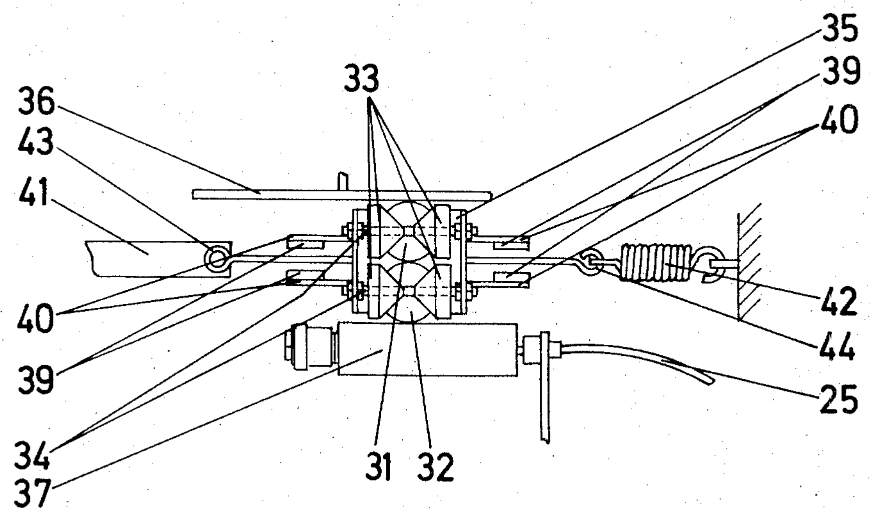

The construction and operation of the bicycle according to the invention will be fully disclosed hereinafter, reference being had to the accompanying drawings, wherein FIG. 1 is a side view of a part of a bicycle ergometer provided with the device according to one embodiment of the invention, FIG. 2 is a front view of the same part of the bicycle ergometer, FIG. 3 is a side view of a modification of an integrator included in the bicycle ergometer, FIG. 4 is a top view of the same embodiment as in FIG. 3, and FIG. 5 is a top view of another modification of the integrator.

In the first embodiment, shown in FIGS. 1 and 2, 1 is a stand of a bicycle ergometer, in which stand is rotatably mounted a flywheel 2 carried by a pedal crankshaft 2*a* rotated by conventional pedals (not shown). Around this and over a guide pulley 3 is placed a brake strip 4. In order to vary the contact pressure of the strip against the flywheel and thus control the brake power there is a tensioning device consisting of a guide pulley 5, against the upper side of which the brake strip placed, and an arm 6 carrying this guide pulley 5. The arm 6 is rotatably mounted around a pin 7 fastened to the stand 1. For setting of the position of pulley 5 the arm 6 can be provided with a handle 8 or for instance through a draw-wire or another member may be connected to a control member placed on the handlebar of the bicycle ergometer or elsewhere and suitable for the setting of the brake power.

To a part 9 branched off from the brake strip 4 is by means of screws 10 fastened an angularly bent arm 11, longitudinally movable and laterally and vertically guided by the guide pulley 3 and rollers 12, 13 and 14, which as also is the guide pulley 3 are rotatably mounted in the stand 1. In its lower end the arm 11 is pivotally connected to a pendulum arm 15 through a slot 16 in the last-mentioned arm. This arm at its upper end is rotatably mounted about a pin 17 fastened to the stand 1 and at its lower end is provided with claws 18, which with a certain play clasp a ball 19, so that this ball will be rotatable within the claws.

The ball 19 is in driven engagement with a disc 20, situated on the one side of the ball and driven from the flywheel 2 (see FIG. 2) via belt 23 over a belt pulley 21 and a shaft 22, and is further on its other side in driving engagement with a cylinder 24 having a horizontal axis and a fixed rotational center. The axis of the cylinder 24 is parallel to the plane of the disc 20. The position of the cylinder 24 and the disc 20 and the diameter of the ball 19 are so chosen, that this ball, when it by its own weight rests in the substantially V-shaped gap between the disc and the cylinder and is moved by the pendulum arm 15 along the surface of the cylinder 24, will be so displaced, that its contact point with the disc 20 moves along a line lying in the plane of the disc and passing through the center of the disc. Furthermore the distance between the disc 20 and the cylinder 24 is such, that under power transmission from the disc 20 via the ball 19 to the cylinder 24 a jamming action arises, so that the power transmission will be improved.

To a suitable end of the cylinder 24 is connected a wire 25 for driving an instrument 25a placed on the bicycle and being of the same type as a vehicle instrument containing a mileometer and a speedometer. The device corresponding to the mileometer indicates continuously and in a suitable energy unit the energy delivered to the bicycle after the zero setting of the meter and the device corresponding to the speedometer indicates continuously and in suitable units the instantaneous effort delivered to the bicycle.

In order to indicate the effort it is also possible instead of a speedometer to use a tachometer, e.g. of such a type as is used in cars, which meter by sensing the ignition pulses to the spark plugs measures the pulse frequency and thus the engine speed.

If an instrument of the last mentioned type is used in the bicycle ergometer, the wire 25 will be superfluous. On the other hand there must be added to the cylinder 24 a suitable contact piece 26 for such a cooperation with an electric circuit (not shown on the drawings), that this circuit will be closed in a certain rotational position of the contact piece 26, e.g. once during each revolution of the cylinder 24. Each closing of the circuit gives an impulse to said effort indicating tachometer. The pulses are supplied to an instrument, which counts them and the result of which thus is a measure of the energy delivered to the bicycle during a certain time.

To the pendulum arm 15 is fastened a pointer 27 or arranged another suitable device for cooperation with a scale (not shown) in order to indicate in a suitable power unit the magnitude of the pedal power or of the brake power acting on the flywheel 2.

The shaft 22 is the input shaft of a reduction gear, consisting of the disc 20, the ball 19 and the cylinder 24 and having an output shaft in the form of wire 25. The ball 19, the disc 20 and the cylinder 24 also form a mechanical integrator of analog-type. When pedaling the bicycle the disc 20 will be rotated, e.g. will be driven from the flywheel 2 by means of the belt 23 as is described above or in another suitable way. The disc 20 may even be replaced by the flywheel 2, which in such a case must be one-sidedly mounted, to permit moving the ball 19 as far as to its center point or to the immediate vicinity of this point. This is necessary, so that the device can give correct measurement results in such cases, where the brake power from the brake strip 4 has been adjusted down to practically zero. However, if the lowest load values are disregarded, the flywheel can be mounted in a two-sided bearing, as under this presumption there is no need of moving the ball 19 as far as to the center axis of the flywheel.

When the brake power is zero, the parts are in the positons shown in FIG. 1. The ball 19 at zero brake power is in the center of the disc 20 and, when this is rotated, no rotation will be transferred to the cylinder 24 and the measuring instruments for energy, effort and power will show no deflection.

If the brake strip 4 by means of the tensioning device 5, 6, 7 and 8 has been tensioned and the flywheel 2 is rotated through pedaling the pedals of the bicycle, the brake strip 4 will brake the flywheel 2. A reaction force of the same magnitude as the brake force will arise at point 28, where the brake strip 4 is fastened to the spring 29 used as a brake power sensing device. This spring is at its end 30 opposite to point 28 fastened to the stand 1. The brake power extends the spring 29 by a distance, which is directly proportional to the magnitude of the brake power. The length increase of the spring 29 through its extension causes the angularly bent arm 11 to move to the left a distance, which is equal to the length increase of the spring 29. This means that the pendulum arm 15 will be turned in clockwise direction, its claws 18 moving the ball 19 to the left and parallel to the rotational axis of the cylinder 24, bringing the ball into a position such, that the contact point between the ball 19 and the disc 20 is located in a distance from the center point of the disc 20 which is proportional to the extension of the spring 29. In this position the ball 19 transfers rotation from the disc 20 to the cylinder 24, the rotation of which in turn brings about the indication of energy and effort on the meter 25a intended for this and through the wire 25 connected to the cylinder 24. At the same time the deviation of the pointer 27, due to the inclining of the pendulum arm 15, indicates the existing brake power.

Thus the device provides for the direct reading of the energy delivered to the bicycle during a certain time and of the instantaneous effort delivered to the bicycle and this independent of the choice of the pedaling person to deliver the effort with high pedal power and low pedal speed or vice versa. Furthermore the pedal power or the brake power acting on the flywheel 2 can be read. Of course the parts included in the device must be so dimensioned that the magnitudes mentioned are indicated in correct figures on the reading instruments.

The invention according to FIGS. 1 and 2 has the advantage, that the device is simple and therefore cheap to make. Provided a certain cost increase is acceptable the refinement can be introduced, that the hysteresis when moving the rotation transferring component, the ball 19, is decreased, which causes an increase of the accuracy of the device.

An embodiment characterized by an especially low hysteresis when changing the ball position in the integrator is shown in FIGS. 3 and 4. Instead of using a single ball guided by claws 18 as in the device according to FIGS. 1 and 2, according to this new embodiment two balls 31 and 32 are used, which are mounted between eight support rollers 33, rotatably mounted about four shafts 34 in a ball casing 35. Through engagement both with each other and with a disc 36 and a cylinder 37, corresponding to the members 20 and 24 in the first embodiment, the balls 31 and 32 transfer rotation between this disc and this cylinder. Variation of the distance between the contact point of the ball 31 against the disc 36 and the center of said disc, which variation is made by moving the ball casing 35 parallel to the axial direction of the cylinder 37, takes place with very little hysteresis, due to the fact that the lateral force on the balls 31 and 32, which force is connected with the movement of the ball casing, is exerted by the rotatable rollers 33 instead by stationary elements as the claws 18 in FIGS. 1 and 2.

The rectilinearity of the movement of the contact point between the ball 31 and the disc 36 is provided for by a rectilinear guide according to Watt's principle, the links 39 rotatably mounted through the points 38 in the stand 1 corresponding to the crank arms in such a rectilinear guide and the ball casing 35 with mounting lugs 40 corresponding to the coupling bar included in the same rectilinear guide. The insertion of the ball casing and its mounting lugs as a component in Watt's rectilinear guide means ensures that it will be simply built. Furthermore the friction conditions are more favourable in the rectilinear guide than in normal devices for roller or slide bearings intended for directly bringing about a rectilinear movement.

The variation of the distance between on the one hand the contact point between the ball 31 and the disc 36 and on the other hand the center point of the disc 36 as a function of the brake power exerted by the brake strip 41 of the bicycle is such, that the extension of a spring 42 under the action of the reaction force of the brake power causes a displacement of the ball casing 35 equal in length to the extension of the spring 42. This action is achieved in, that one end of the brake strip 41 is fastened to a mounting lug 43 belonging to the ball casing 35, whereas to another mounting lug 44 of the same casing is fastened one end of the spring 42, the other end of which is fastened to the stand 1. In other respects there is no difference between this arrangement and that according to FIGS. 1 and 2 except that in this last described embodiment the angularly bent arm 11 and the rollers 12, 13 and 14 have been eliminated.

Without impairing to any appreciable degree the good hysteresis conditions mentioned above in connection with the embodiment according to FIGS. 3 and 4 the ball casing 35 can be modified in a way which makes it essentially cheaper to produce.

In this modification of the ball casing the bearing of the balls supported by the casing is in the form of slide bearing instead of in the form of a roller bearing. An embodiment of a ball casing according to this principle is shown in FIG. 5. The casing consists of a tube 45, placed between the disc 46 and the cylinder 47 and so dimensioned that two equal sized balls 48 and 49 in a row are freely rotatable within it. The tube 45 has a length, which is somewhat shorter than the double diameter of each ball and may have applied to its inside a friction decreasing material. The tube is on its outside provided with mounting lugs similar to lugs 40, 43 and 44, shown in the ball casing 35 in FIGS. 3 and 4, and is otherwise included in the arrangement in the same way as this is.

The invention has here been disclosed in some special embodiments. Of course these as well as other described devices can be modified within the scope of the invention.

What we claim is:

1. A bicycle exerciser or ergometer comprising an input disc-shaped member rotated by pedaling, an output rotatable cylindrical member, ball means disposed between and in frictional contact with said disc-shaped member and said cylindrical member, said cylindrical member being parallel to the surface of said disc-shaped member which is contacted by said ball means, means for braking the rotation of said disc-shaped member, means responsive to said braking means to move said ball means toward or away from the axis of rotation of said disc-shaped member while maintaining said ball means in frictional contact with said disc-shaped member and with said cylindrical member to rotate said cylindrical member, and means responsive to rotation of said cylindrical member to indicate the work performed to rotate said disc-shaped member against the operation of said braking means, said moving means comprising a pendulum arm mounted for vertical swinging movement about a horizontal axis, means responsive to said braking means to swing said pendulum arm, said pendulum arm having claws at the lower end thereof clasping said ball means but leaving said ball means free to rotate.

2. A bicycle exerciser or ergometer as claimed in claim 1, said ball means comprising a single ball.

3. A bicycle exerciser or ergometer as claimed in claim 1, said ball means resting by gravity in a trough defined by and between said disc-shaped member and said cylindrical member.

4. A bicycle exerciser or ergometer as claimed in claim 1, and a flywheel for rotating said disc-shaped member.

* * * * *